(No Model.) 2 Sheets—Sheet 1.

T. S. RUST.
PHOTOGRAPHIC CAMERA.

No. 382,735. Patented May 15, 1888.

Witnesses
Fred Lempfer
M. J. Roach

Inventor
T. S. Rust.
By his atty
Gifford Brown (No Model.) 2 Sheets—Sheet 2.

T. S. RUST.
PHOTOGRAPHIC CAMERA.

No. 382,735. Patented May 15, 1888.

Witnesses.
Fred Kempfer.
Maurice J. Roach.

Inventor,
T. S. Rust.
By his attorneys,
Gifford & Brown

UNITED STATES PATENT OFFICE.

THEODORE S. RUST, OF MERIDEN, CONNECTICUT, ASSIGNOR TO THE SCOVILL MANUFACTURING COMPANY, OF NEW YORK, N. Y.

PHOTOGRAPHIC CAMERA.

SPECIFICATION forming part of Letters Patent No. 382,735, dated May 15, 1888.

Application filed March 16, 1888. Serial No. 267,317. (No model.)

*To all whom it may concern:*

Be it known that I, THEODORE S. RUST, of Meriden, in the county of New Haven and State of Connecticut, have invented a certain new and useful Improvement in Photographic Cameras, of which the following is a specification.

My improvement relates to the class of cameras called "detective-cameras."

I will describe a photographic camera embodying my improvement in detail, and then point out the novel features in the claims.

Figure 1:
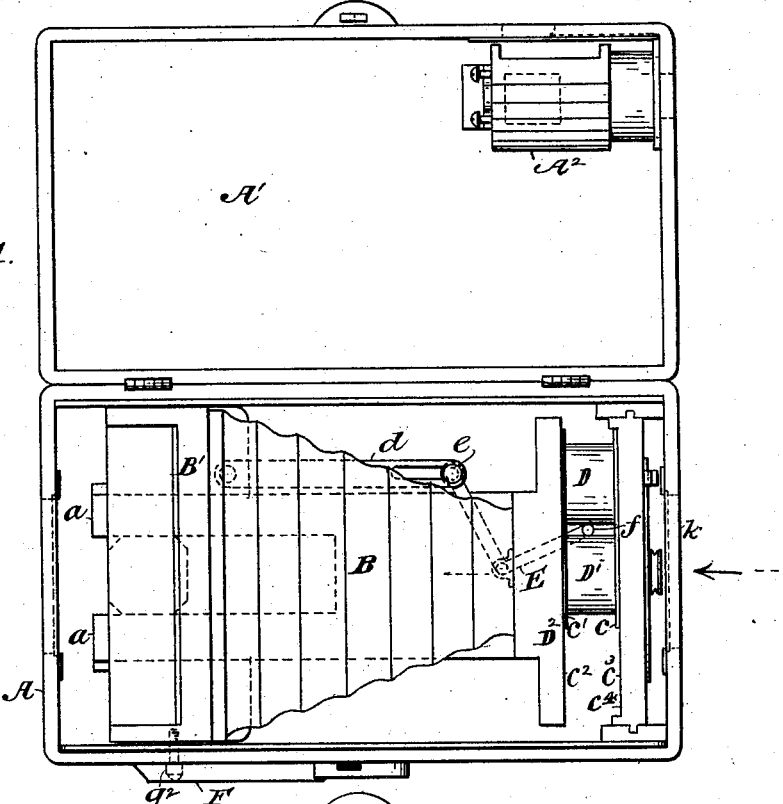
Figure 2:
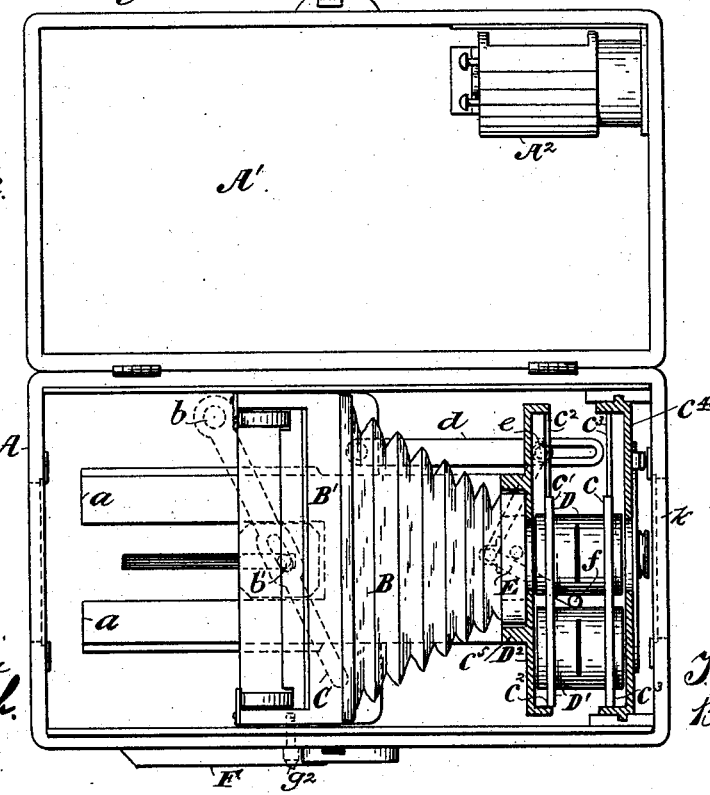
Figure 3:
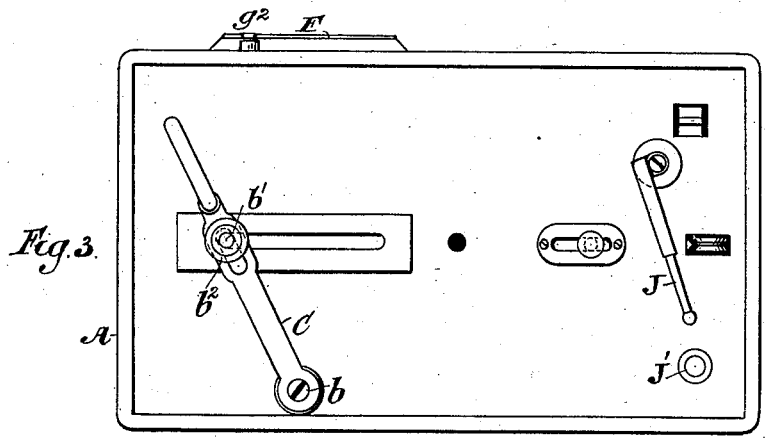
Figure 4:
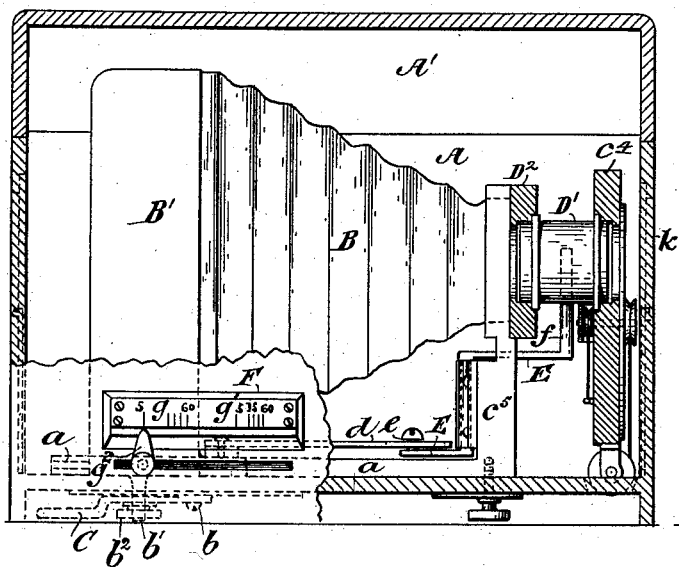
Figure 5:
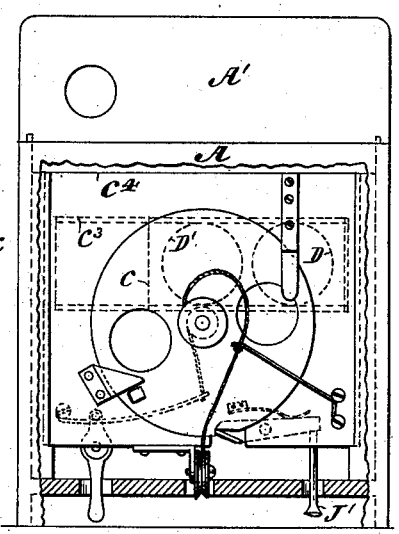

In the accompanying drawings, Figure 1 is a plan or top view of a camera embodying my improvement. Fig. 2 is a similar view showing the parts in a different position from that shown in Fig. 1. Fig. 3 is a bottom view of the same. Fig. 4 is a side view, certain parts being broken away to conduce to a clearer illustration. Fig. 5 is an end view looking in the direction of the arrow, Fig. 1.

Similar letters of reference designate corresponding parts in all the figures.

A designates a box or case for the camera, and A' a cover therefor hinged thereto. $A^2$ designates a finder for the camera.

B designates the bellows of the camera. The same is provided with a movable back, B', which may be of the usual or any desirable construction. This movable back is adapted to be slid to and fro on slideways $a$ upon the bottom of the camera box or case.

The camera-back is moved to and fro, and the bellows contracted and distended by means of a lever, C, fulcrumed upon a screw, $b$, upon the bottom of the camera. A rod, $b'$, extending from the camera-back and through a slot in the lever C, forms the connection between the camera-back and the lever. A jam-nut, $b^2$, may be manipulated to secure the lever C in any desired position.

I will now describe means whereby lenses of different focus may be moved into position to focus the image to be photographed, while at the same time the bellows and movable back are moved to accommodate the focus of the lens being used, premising with the statement that it is often desirable to employ in a camera lenses which will focus at different distances.

D D' designate the lens-tubes provided with lenses in the usual or any desirable manner. These lenses have different foci. The lens-tubes are mounted in sliding pieces $c\,c'$, which sliding pieces are adapted to be slid to and fro in slideways $c^2\,c^3$, formed the one in a diaphragm, $c^4$, near the front end of the camera, and the other in the fixed front piece, $D^2$, of the camera, to which the front of the bellows is affixed. This front piece is supported, as here shown, upon a support, $c^5$, secured near one end to one of the slideways $a$ and near the other end to said front piece.

Secured near one of its ends to the movable back B' is a rod, $d$. Near its other end this rod has a sliding connection with one of the ends of a bell-crank lever, E. Such connection is made by providing the rod with a longitudinal slot through which extends loosely a pin or stud, $e$, secured in the bell-crank lever. Extending upwardly from the other end of the bell-crank lever is a rod or projection, $f$. The upper portion of this rod extends between the lens-tubes D D'. When the lever C is manipulated to move the camera-back, the rod $d$ will of course be moved with it. The slotted connection which the rod $d$ has with the bell-crank lever E admits of a range of movement of the movable back and said rod without imparting movement to the bell-crank lever. This range of movement admits of variation in the foci of the sensitized plate relatively to the lens being used. I have shown a gage, F, provided with two sets of gage-marks, $g\,g'$. A pointer, $g^2$, having a connection with the movable back of the camera, indicates the focus as the movable back is manipulated. The index, it will be seen, is upon the exterior of the side of the box or case. When the rod $d$ has been moved sufficiently far in either direction to cause the pin or stud $e$ to abut against the metal at the end of the slot, the bell-crank lever E will be rocked, and the rod $f$, extending between the lens-tubes D D', will be caused to move the lens-tubes from side to side, according to the direction in which the bell-crank lever is rocked. The range of such movement is only sufficient to bring the desired lens into position opposite the opening $k$ in the camera box or case. The means I have shown for shifting the lens-tubes and consequently the lenses at the same time that the movable back and bellows are manipulated is only one of many that could be adopted, and I do not therefore wish to limit myself to the use of such means specifically.

As the other portions of the camera are not embodied in my improvement, I will not here enter into a description of them further than to say that J designates a lever for revolving a fly-shutter in one direction. J' designates a push-piece for causing the release of the fly-shutter.

What I claim as my invention, and desire to secure by Letters Patent, is—

1. In a photographic camera, the combination, with a box or case, of a movable back, two lens-tubes provided with lenses, and an adjusting device to adjust the lens-tubes during the movement of the movable back, substantially as specified.

2. In a photographic camera, the combination, with a box or case, of a movable back, two lens-tubes provided with lenses, and an adjusting device to adjust the lens-tubes during the movement of the movable back, said adjusting devices being capable of a limited range of movement without affecting the movement of the lens-tubes, substantially as specified.

3. In a photographic camera, the combination, with a box or case, of a movable back, two lens-tubes provided with lenses, a rod connected to the movable back and provided with a slot, a bell-crank lever having a loose connection with said rod, and a rod or projection on said lever extending between said lens-tubes, and a lever for causing the adjustment of the movable back and the lens-tube, substantially as specified.

THEODORE S. RUST.

Witnesses:
ERWIN D. HALL,
RICHARD GLEESON.